(12) United States Patent
Tanaka et al.

(10) Patent No.: US 9,027,881 B2
(45) Date of Patent: May 12, 2015

(54) COMPOSITE MATERIAL STRUCTURE AND AIRCRAFT WING PROVIDED THEREWITH

(75) Inventors: Yuya Tanaka, Minato-ku (JP); Hideyuki Suzuki, Minato-ku (JP); Yutaka Kanayama, Minato-ku (JP); Kazuki Sato, Minato-ku (JP); Masatake Hatano, Minato-ku (JP); Satoru Saito, Minato-ku (JP); Akihisa Watanabe, Minato-ku (JP); Ryo Abe, Minato-ku (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 154 days.

(21) Appl. No.: 13/881,521

(22) PCT Filed: Jan. 26, 2012

(86) PCT No.: PCT/JP2012/051700
§ 371 (c)(1),
(2), (4) Date: Apr. 25, 2013

(87) PCT Pub. No.: WO2012/105416
PCT Pub. Date: Aug. 9, 2012

(65) Prior Publication Data
US 2013/0216766 A1  Aug. 22, 2013

(30) Foreign Application Priority Data
Feb. 4, 2011  (JP) .................................. 2011-023155

(51) Int. Cl.
*B64C 3/26*  (2006.01)
*B32B 7/04*  (2006.01)
(Continued)

(52) U.S. Cl.
CPC . *B64C 3/26* (2013.01); *B64C 3/182* (2013.01); *B64C 3/20* (2013.01); *B32B 7/04* (2013.01); *B64C 3/34* (2013.01)

(58) Field of Classification Search
CPC .................................... B64C 3/26; B32B 7/04
USPC .................................... 428/58, 61; 244/123.1
See application file for complete search history.

(56) References Cited

U.S. PATENT DOCUMENTS

| 4,643,646 A | 2/1987 | Hahn et al. |
| 4,732,542 A | 3/1988 | Hahn et al. |

(Continued)

FOREIGN PATENT DOCUMENTS

| JP | 62-157894 | 7/1987 |
| JP | 62-168789 | 7/1987 |

(Continued)

OTHER PUBLICATIONS

International Search Report issued May 1, 2012 in International (PCT) Application No. PCT/JP2012/051700.

(Continued)

*Primary Examiner* — Alexander Thomas
(74) *Attorney, Agent, or Firm* — Wenderoth, Lind & Ponack, L.L.P.

(57) ABSTRACT

Provided is a composite material structure enabled to be reduced in weight. The composite material structure includes a front section (3a) extending in one direction and formed as a composite material made of fiber reinforced plastics, a rear section (3c) separated from the front section (3a) by a predetermined space, extending in the one direction, and formed as a composite material made of fiber reinforced plastics, and access panels (5) provided between the front section (3a) and the rear section (3c) and having a dimension in the one direction shorter than the front section (3a) and the rear section (3c). The access panels (5) are fixed to the front section (3a) and the rear section (3c) in an orthogonal direction substantially orthogonal to the one direction and set to be displaceable in the one direction and are removable.

4 Claims, 6 Drawing Sheets

(51) Int. Cl.
*B64C 3/18* (2006.01)
*B64C 3/20* (2006.01)
*B64C 3/34* (2006.01)

(56) References Cited

U.S. PATENT DOCUMENTS 4,741,943 A 5/1988 Hunt
4,749,155 A 6/1988 Hammer et al.
2004/0124311 A1 7/2004 Kordel et al.

FOREIGN PATENT DOCUMENTS

| | | |
|---|---|---|
| JP | 3-12232 | 2/1991 |
| JP | 2000-6893 | 1/2000 |
| JP | 2001-30997 | 2/2001 |
| JP | 2002-302097 | 10/2002 |

OTHER PUBLICATIONS

Written Opinion of the International Searching Authority issued May 1, 2012 in International (PCT) Application No. PCT/JP2012/051700.

COMPOSITE MATERIAL STRUCTURE AND AIRCRAFT WING PROVIDED THEREWITH

TECHNICAL FIELD

The present invention relates to a composite material structure including holes and an aircraft wing having the composite material structure.

BACKGROUND ART

In the fields of aircrafts, ships, vehicles, and the like, a composite material made of fiber reinforced plastics (FRP) is widely used as a structure increased in strength and reduced in weight. Holes are sometimes formed in such a composite material for inspection and for access during assembly. When the holes are formed, since stress concentration occurs in the peripheral edge portions of the holes, it is necessary to increase the strength of the peripheral edge portions of the holes.

PTL 1 described below discloses an invention for adding a reinforcing layer to increase thickness and increasing strength in order to reinforce the peripheral edge portions of access holes of an outer plate of an aircraft. The reinforcing layer described in PTL 1 is fixed to a base material by pins or stitches to prevent the reinforcing layer from peeling when the reinforcing layer receives a load.

CITATION LIST

Patent Literature

{PTL 1}
Japanese Translation of PCT international Application, Publication No. 2003-513821

SUMMARY OF INVENTION

Technical Problem

However, the invention described in PTL 1 has a problem in terms of productivity because a process for applying the pins or the stitches to the reinforcing layer when the reinforcing layer is added increases.

As a method of not using such pins or stitches, a lower surface outer plate 103 of a wing 100 of an aircraft having a structure shown in FIG. 6 is known. As shown in FIG. 6A, a plurality of access holes 102 are formed in the center section in the width direction of the lower surface outer plate 103. The access holes 102 are used for inspection or during assembly of a fuel tank provided in the wing 100. Broken lines shown in the figure indicate contour lines of the wing 100 including a flap and a slat.

To increase the strength of the peripheral edge portions of the access holes 102, as shown in FIG. 6B, a laminate for reinforcement 104 is stacked (padded up) on a base material laminate 106. When viewed in section as shown in FIG. 6B, the laminate for reinforcement 104 has a shape formed with a taper reduced in thickness further away from the access hole 102. To reinforce the access hole 102, a fixed thickness portion 104a located in the peripheral edge portion of the access hole 102 and having fixed thickness is enough. However, if only the fixed thickness portion 104a is formed, peeling occurs in an interface with the base material 106 when the fixed thickness portion 104a receives a load. To prevent the peeling, the fixed thickness portion 104a is not only formed but also further extended to form a taper portion 104b and gradually increase thickness. Note that, in FIG. 6B, the taper portion 104b is hatched to facilitate understanding. However, the taper portion 104b and the fixed thickness portion 104a are continuous and formed by the same stacked sheet.

In the structure shown in FIGS. 6A and 6B, the process for applying the pins or the stitches described in PTL 1 is unnecessary. However, from the viewpoint of only reinforcement of the access hole 102, the taper portion 104b is originally unnecessary and is a cause of an increase in weight.

The present invention has been devised in view of such circumstances and it is an object of the present invention to provide a composite material structure with holes enabled to be reduced in weight and an aircraft wing provided therewith.

Solution to Problem

In order to solve the problems, a composite material structure and an aircraft wing provided therewith of the present invention adopt the following solutions.

That is, a composite material structure according to a first aspect of the present invention includes: a first structure member extending in one direction and formed as a composite material made of fiber reinforced plastics; a second structure member separated from the first structure member by a predetermined space, extending in the one direction, and formed as a composite material made of fiber reinforced plastics; and a panel provided between the first structure member and the second structure member and having a dimension in the one direction shorter than the first structure member and the second structure member. The panel is not movable from the first structure member side and from the second structure member side in an orthogonal direction substantially orthogonal to the one direction and set to be displaceable in the one direction and is removable.

When a tensile load or a compression load is applied in the one direction of the composite material structure, since the panel is set to be displaceable in the one direction, only the first structure member and the second structure member bear the load. On the other hand, not only the first structure member and the second structure member but also the panel fixed in the orthogonal direction bear a load (a shearing load) in the orthogonal direction of the composite material structure. In this way, the panel bears only the shearing load and does not need to bear the tensile load and the compression load. Therefore, it is possible to reduce strength of the panel. That is, it is possible to reduce the thickness of the panel and realize a reduction in weight.

Since the panel is removable, a hole formed after the panel is removed can be used for various kinds of work such as maintenance. In this way, a composite material structure with holes can be realized by the removable panel.

As the material of the panel, fiber reinforced plastics is suitable. However, the material may be other materials. For example, a metal material such as a titanium alloy or an aluminum alloy can also be used.

Further, the composite material structure according to the first aspect may include a plurality of the panels. The panels may be continuously provided side by side over the one direction.

Since the plurality of panels are continuously provided side by side over the one direction, it is possible to form a hole in an arbitrary position by removing the panel in an arbitrary position.

Further, in the composite material structure according to the second aspect, a lower surface outer plate of a wing of an aircraft may be configured by the first structure member, the second structure member, and the panel.

The lower surface outer plate configures a lower surface portion of a torque box that bears a load applied to the wing of the aircraft. Therefore, a tensile load is applied to the lower surface outer plate in the longitudinal direction of the wing during flight. The first structure member and the second structure member bear the tensile load. An access hole for performing inspection and the like of the inside of the torque box is provided in the wing. However, in the present invention, since the hole is formed by removing the panel, the hole can be used as an access hole.

Since the panel does not bear the tensile load, it is possible to provide the wing reduced in weight through reduction in thickness.

Advantageous Effects of Invention

With the composite material structure and the aircraft wing provided therewith of the present invention, since the panel that does not bear the tensile load and the compression load and bears only the shearing load is adopted, it is possible to reduce weight of the panel by reducing thickness of the panel.

Since the panel is removed to form the hole, it is possible to realize the composite material structure with holes.

DESCRIPTION OF EMBODIMENTS

An embodiment of the present invention is explained below with reference to FIGS. 1 to 5.

Figure 1A:
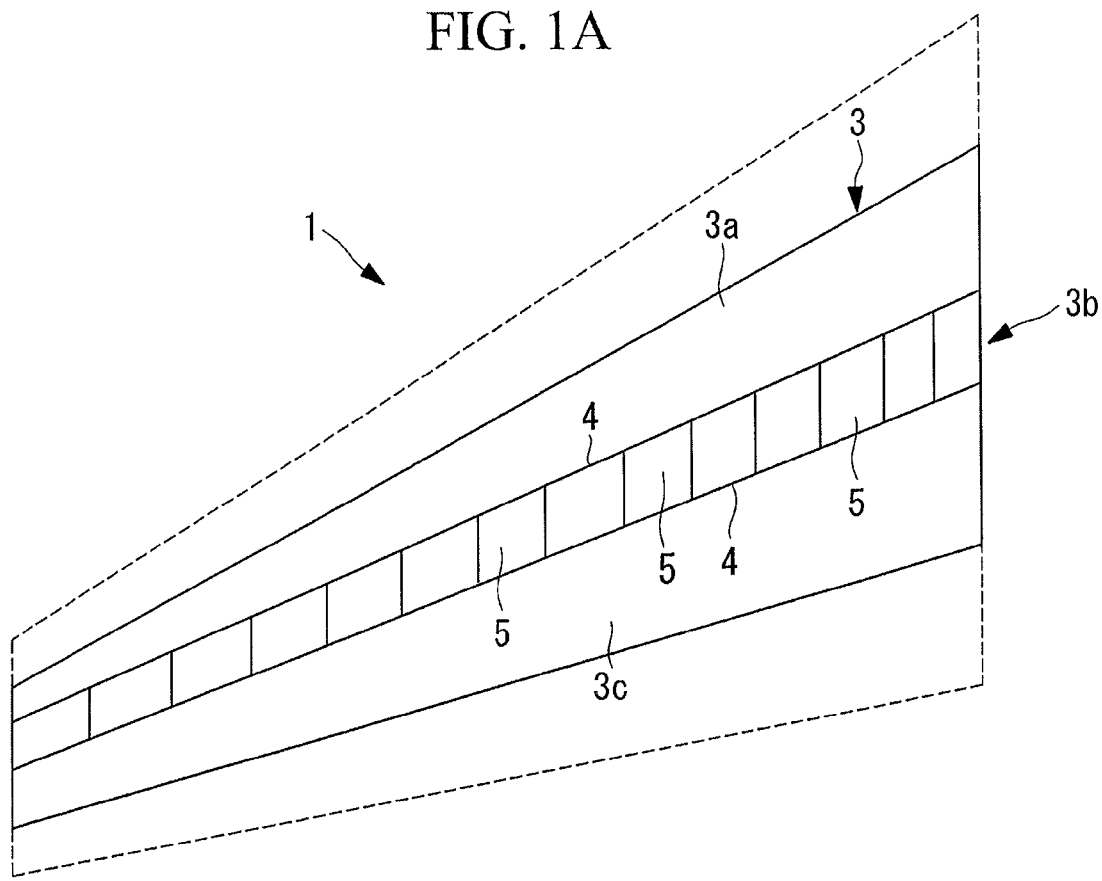
FIG. 1A is a plan view showing a lower surface outer plate of a wing of an aircraft according to an embodiment of a composite material structure of the present invention.

In FIG. 1A, a lower surface outer plate 3 of a wing 1 of an aircraft is shown. The lower surface outer plate 3 is formed by a composite material structure made of fiber reinforced plastics (FRP). Broken lines shown in the figure indicate contour lines of the wing 1 including a flap and a slat.

The lower surface outer plate 3 is configured by three sections, i.e., a front section (a first structure member) 3a located on the front edge side of the wing 1, a center section 3b connected to the front section 3a, and a rear section (a second structure member) 3c connected to the center section 3b and located on the rear edge side of the wing 1. The front section 3a, the center section 3b, and the rear section 3c are divided on a division surface 4 extending in the longitudinal direction of the wing 1.

The center section 3b is configured to a plurality of access panels 5 continuously arranged along the longitudinal direction of the wing 1 (one direction).

Figure 2:
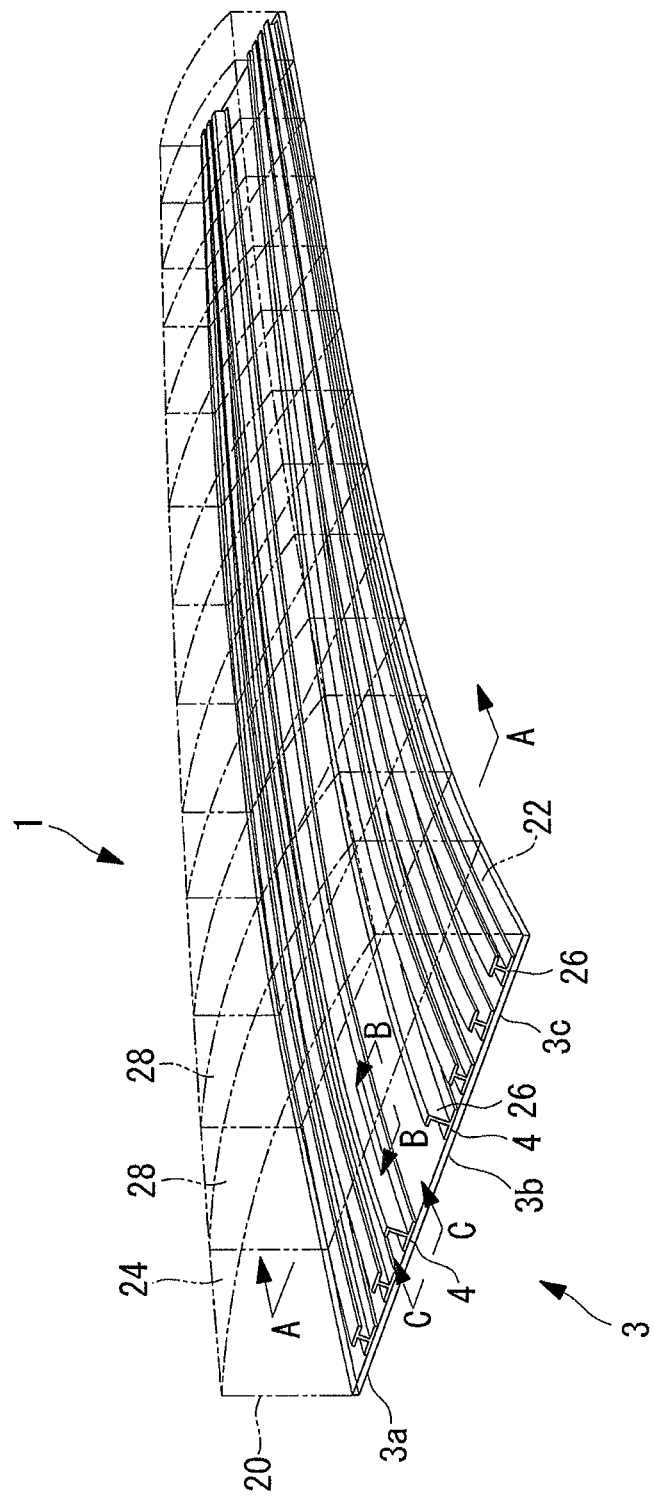
FIG. 2 is a perspective view showing the lower surface outer plate and stringers that configure a part of the wing formed in a box structure.
Figure 3:
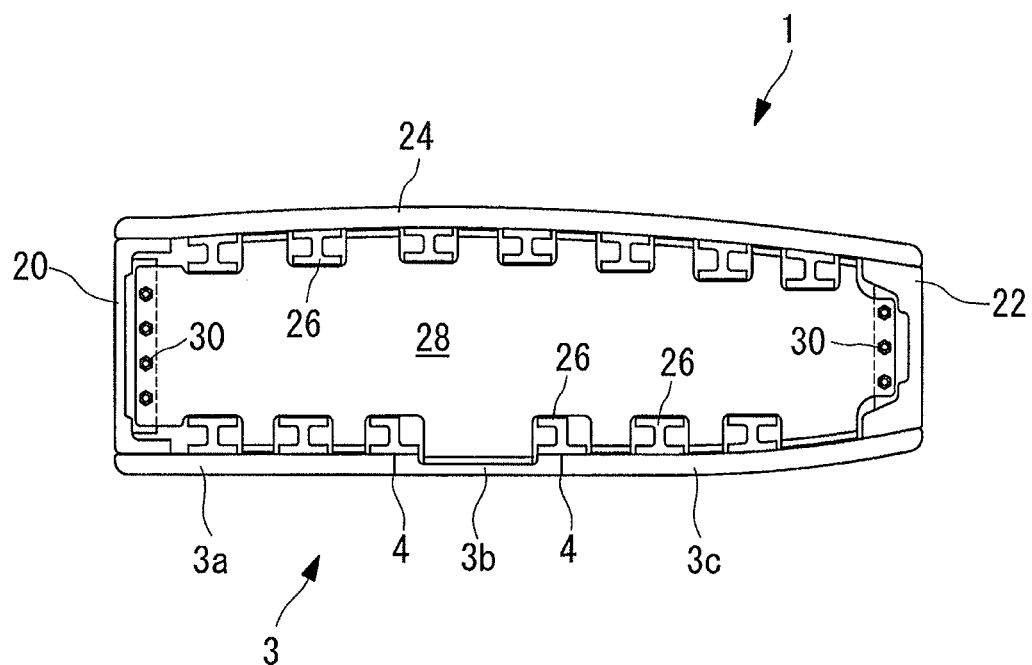
FIG. 3 is a cross sectional view in A-A in FIG. 2.

As shown in FIGS. 2 and 3, the lower surface outer plate 3 forms a torque box having a box shape in conjunction with a front spar 20 and a rear spar 22, which are side surface outer plates, erected from both ends in the width direction of the lower surface outer plate 3 and an upper surface outer plate 24 that connects upper ends of the front spar 20 and the rear spar 22. The lower surface outer plate 3 bears a load of the wing 1.

A plurality of stringers 26 are provided in the longitudinal direction of the wing 1. The stringers 26 are composite materials made of FRP like the lower surface outer plate 3 and the like. The respective stringers 26 are fixed to the inner surfaces of the lower surface outer plate 3 and the upper surface outer plate 24 and mainly bear a load in the longitudinal direction of the wing 1.

On the inside of the wing 1 formed in the box structure, ribs 28 are provided to divide an internal space of the wing 1 into a plurality of spaces in the longitudinal direction. The ribs 28 are formed in a plate shape extending over the width direction (a direction orthogonal to the longitudinal direction) of the wing 1. A plurality of ribs 28 are arranged at a predetermined interval in the longitudinal direction. As shown in FIG. 3, the front and rear ends of the respective ribs 28 are respectively fixed to the front spar 20 and the rear spar 22 by predetermined fasteners 30 such as bolts and nuts.

The front section 3a of the lower surface outer plate 3 is a composite material mainly formed of carbon fiber reinforced plastics (CFRP). A ratio of orientation of carbon fiber is set to a normal degree used in a structure of an aircraft. For example, when an extending direction (the longitudinal direction) of the wing 1 is 0°, a plurality of sheets having respective fiber directions are stacked to configure the composite material such that the ratio is (0°, +45°, −45°, 90°)=(30%, 30%, 30%, 10%). The number of stacked layers of the composite material used in the front section 3a is determined by bearing strength.

Like the front section 3a, the rear section 3c of the lower surface outer plate 3 is a composite material mainly formed of carbon fiber reinforced plastics (CFRP). Like the front section 3a, a ratio of orientation of carbon fiber is set to a normal degree used in a structure of an aircraft. For example, when an extending direction of the wing 1 is 0°, a plurality of sheets having respective fiber directions are stacked to configure the composite material such that the ratio is (0°, +45°, −45°, 90°)=(30%, 30%, 30%, 10%). The number of stacked layers of the composite material used in the rear section 3c is determined by bearing strength.

The access panels 5 that configure the center section 3b of the lower surface outer plate 3 are composite materials mainly formed of carbon fiber reinforced plastics (CFRP).

The access panels 5 are removable and can be used as access holes (holes) 5 used during inspection, during assembly, and the like of a fuel tank provided in the wing 1. Consequently, the lower surface outer plate 3 of the wing 1 can be used as a structure member with holes. The access holes 5 are not formed in the front section 3a and the rear section 3c described above.

Figure 1B:
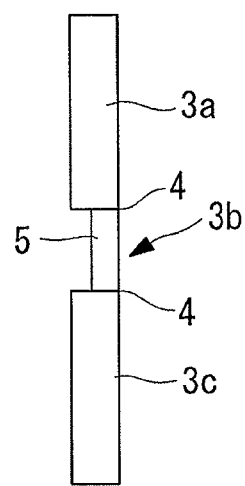
FIG. 1B is a longitudinal sectional view showing the lower surface outer plate of the wing of the aircraft according to the embodiment of the composite material structure of the present invention.

As shown in FIG. 1B, the access panel 5 does not need to bear a load in the longitudinal direction of the wing 1 compared with the front section 3a and the rear section 3c. Therefore, the number of stacked layers is reduced to reduce thickness.

As the access panel 5, a metal material such as a titanium alloy and an aluminum alloy may be used.

Next, a method of attaching the access panels 5 is explained.

Figure 4:
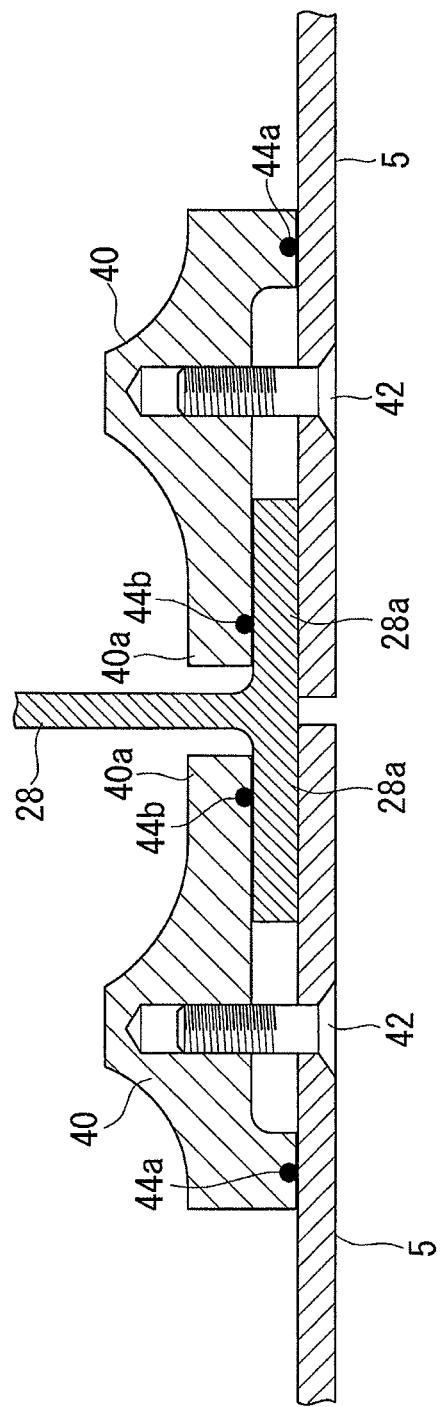
FIG. 4 is a longitudinal sectional view in B-B in FIG. 2.

In FIG. 4, a longitudinal sectional view in B-B in FIG. 2 is shown. In the figure, a method of attaching the access panels 5 in a connecting direction is shown. The access panels 5 are slidably (displaceably) attached to a wing main body side (the side of the front section 3a and the side of the rear section 3c fixed to the wing main body). That is, an attachment structure in which a flange section 28a of the rib 28 on the wing main body side is clamped by the access panels 5 and clamp angles 40 is adopted. Specifically, flat head bolts 42 are inserted from the lower surface side of the access panels 5 and screwed into the clamp angles 40 set in above the access panels 5 (in the torque box of the wing 1). Consequently, at rib side ends 40a of the clamp angles 40, spaces between the clamp angles 40 and the access panels 5 are narrowed to clamp the flange sections 28a of the ribs 28. Note that O rings 44a and 44b are respectively provided on contact surfaces of the clamp angles 40 and the access panels 5 and contact surfaces of the clamp angles 40 and the flange sections 28a of the ribs 28. Fluid tightness against fuel stored in the torque box of the wing 1 is secured by the O rings 44a and 44b.

In this way, the access panels 5 are slidably attached to the ribs 28 (i.e., the wing main body side). Therefore, the access panels 5 do not bear a load even when a tensile load (or a compression load) is generated in the longitudinal direction of the wing 1 (in the figure, the left right direction).

Figure 5:
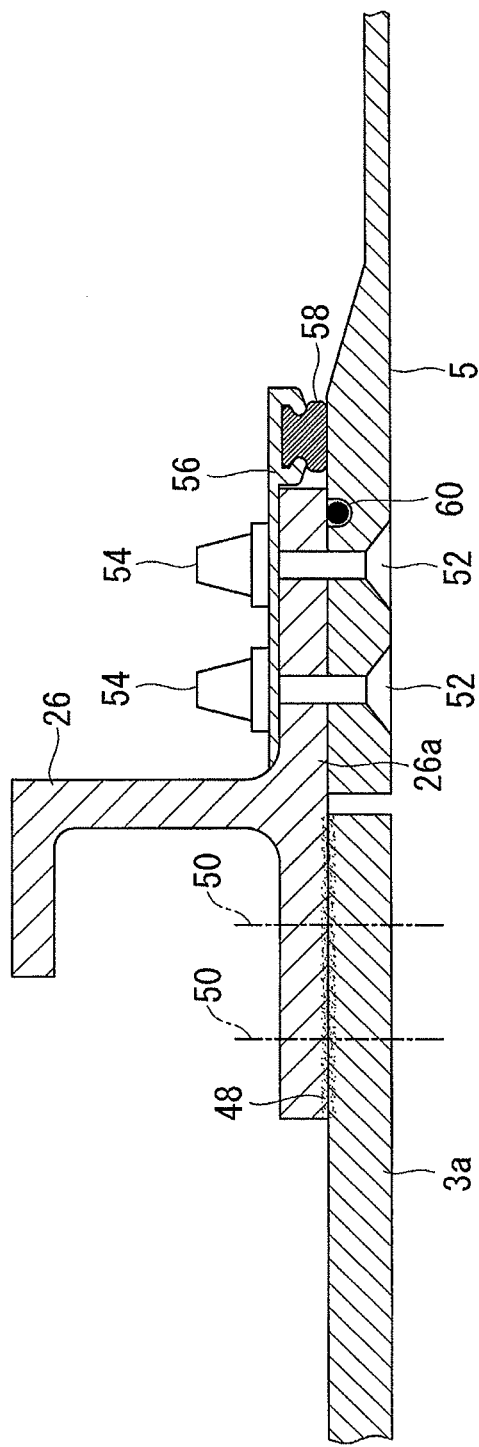
FIG. 5 is a cross sectional view in C-C in FIG. 2.

A cross sectional view in C-C in FIG. 2 is shown in FIG. 5. In the figure, a method of attaching the access panel 5 and the front section 3a is shown. The access panel 5 is fixed to the wing main body side (the side of the front section 3a fixed to the wing main body) via the stringer 26. Although not shown in the figure, connection to the rear section 3c is the same.

The stringer 26 and the front section 3a are fixed by fasteners 50 after being bonded in a bonding section 48. The fixing of the stringer 26 and the front section 3a may be by only bonding or only fasteners. As the bonding, a method of curing both of the stringer 26 and the front section 3a and thereafter bonding the stringer 26 and the front section 3a using an adhesive (an after-cure bonding method) is used. Besides, for example, a co-bond method of interposing an adhesive between the stringer 26 after curing and the front section 3a before curing or between the stringer 26 before curing and the front section 3a after curing and thereafter applying temperature and/or pressure to integrally cure the stringer 26 and the front section 3a or a co-cure method of interposing an adhesive between the stringer 26 before curing and the front section 3a before curing and thereafter applying temperature and/or pressure to integrally cure the stringer 26 and the front section 3a is used.

The access panel 5 is fixed to the stringer 26 by flat head bolts 52. Specifically, the flat head bolts 52 inserted from the lower surface side of the access panel 5 are screwed into dome nuts 54, whereby a flange section 26a and a seal retainer 56 of the stringer 26 clamped between the flat head bolts 52 and the dome nuts 54 are tightened. The dome nuts 54 are provided with a self-sealing function and can be fluid-tightly fixed. A seal tube 58 is provided between the seal retainer 56 and the access panel 5. Further, an O ring 60 is provided between the lower surface of the flange section 26a of the stringer 26 and the access panel 5. Fluid tightness against the fuel stored in the torque box of the wing 1 is secured by the dome nuts 54, the seal tube 58, and the O ring 60.

In this way, the access panel 5 is fixed to the rib 28 (i.e., the wing main body side). Therefore, when a shearing load is generated in a direction orthogonal to the longitudinal direction of the wing 1, the access panel 5 can bear the load in the shearing direction.

Next, the function effects obtained when the wing 1 including the configuration explained above is used are explained.

During flight, a load is applied to the wing 1 to displace the distal end of the wing 1 upward. Therefore, a tensile load is applied to the lower surface outer plate 3 of the wing 1 in the longitudinal direction of the wing 1 (the 0° direction). In this case, since the access panel 5 is set displaceably in the longitudinal direction, only the front section 3a and the rear section 3c bear the load. On the other hand, not only the front section 3a and the rear section 3c but also the access panels 5 bear a load (a shearing load) in an orthogonal direction orthogonal to the longitudinal direction. In this way, the access panels 5 bear only the shearing load and do not need to bear the tensile load and the compression load. Therefore, it is possible to reduce strength of the access panels 5. That is, it is possible to reduce the thickness of the panel to realize a reduction in weight.

Figure 6A:
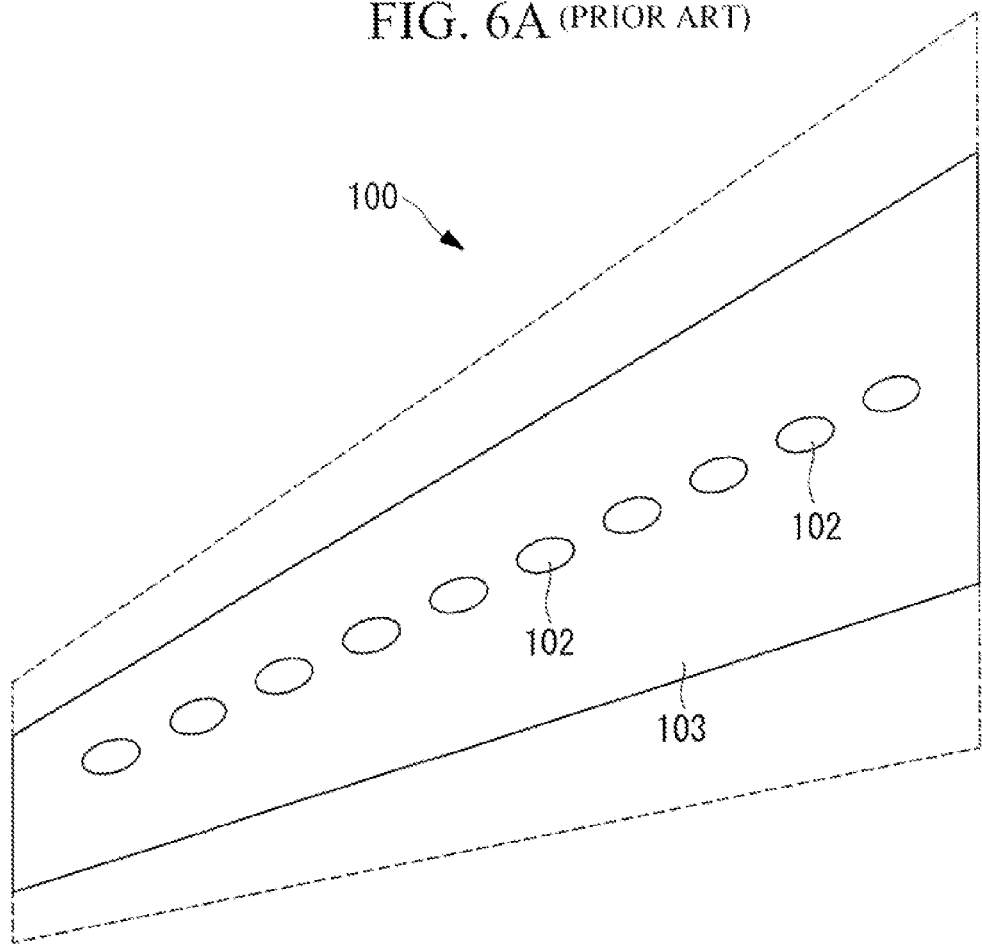
FIG. 6A is a plan view showing a lower surface outer plate of a conventional wing of an aircraft.
Figure 6B:
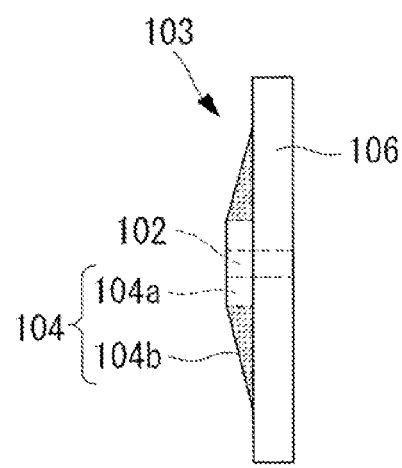
FIG. 6B is a longitudinal sectional view showing the lower surface outer plate of the conventional wing of the aircraft.

For example, when a stress concentration factor around elliptical holes shown in FIG. 6 is 2 and the strength of the structure shown in FIG. 6 is 100, when it is taken into account that a ratio of a shearing load and a tensile load applied to the lower surface outer plate 3 of the wing 1 is 3:7, it is possible to reduce the plate thickness of the access panels 5 to about 15% according to the following equation:

$$100 \div 2 \times (3/10) = 15$$

Compared with the structure shown in FIG. 6, since only the front section 3a and the rear section 3c bear the tensile load, the plate thickness of the front section and the rear section 3c is larger than the plate thickness in the structure shown in FIG. 6. However, as the wing as a whole, it is possible to sufficiently realize a reduction in weight.

Since the access panels 5 are removable, holes formed after the access panels 5 are removed can be used as access holes for maintenance and the like. In this way, the wing formed as the composite material structure with holes can be realized by the removable access panels 5.

Note that, in this embodiment, the application to the lower surface outer plate 3 of the wing 1 is explained. However, the present invention is not limited to this and can be widely applied to composite material structures including holes.

For example, a configuration same as the lower surface outer plate 3 may be applied to an upper surface outer plate that configures a torque box in conjunction with the lower surface outer plate 3.

In the embodiment, carbon fiber reinforced plastics (CFRP) is mainly used. However, the present invention is not limited to this. For example, glass fiber reinforced plastics (GFRP) or aramid fiber reinforced plastics (AFRP) may be used.

REFERENCE SIGNS LIST 1 wing
3 lower surface outer plate (composite material structure)
3a front section (adjacent structure member)
3b center section
3c rear section (adjacent structure member)
5 panels (access panels)

The invention claimed is:
1. A composite material structure comprising:
a first structure member extending in one direction and formed as a composite material made of fiber reinforced plastics;
a second structure member separated from the first structure member by a predetermined space, extending in the one direction, and formed as a composite material made of fiber reinforced plastics; and
a panel provided between the first structure member and the second structure member and having a dimension in the one direction shorter than the first structure member and the second structure member, wherein the panel is not movable from the first structure member side and from the second structure member side in an orthogonal direction substantially orthogonal to the one direction and set to be displaceable in the one direction and is removable.

2. The composite material structure according to claim 1, wherein the composite material structure includes a plurality of the panels, and the panels are continuously provided side by side over the one direction.

3. The composite material structure according to claim 1, wherein a lower surface outer plate of a wing of an aircraft is configured by the first structure member, the second structure member, and the panel.

4. An aircraft wing comprising the composite material structure according to claim 3.

* * * * *